Figure 1:
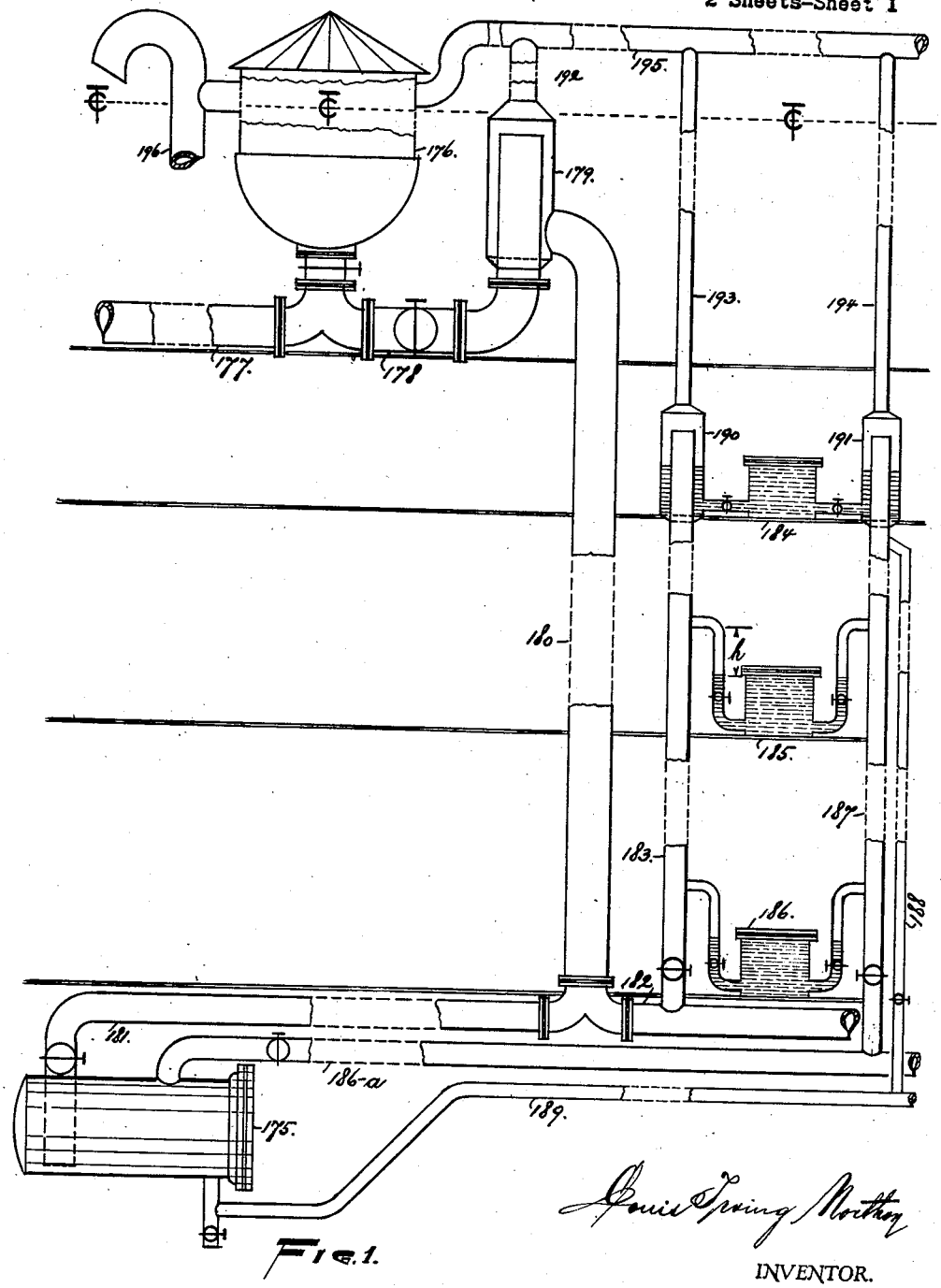

June 18, 1940.  L. I. NORTHON  2,205,305
PREVENTION OF REVERSE FLOW IN WATER SUPPLY SYSTEMS
Filed April 16, 1937  2 Sheets-Sheet 1

INVENTOR.

June 18, 1940.  L. I. NORTHON  2,205,305
PREVENTION OF REVERSE FLOW IN WATER SUPPLY SYSTEMS
Filed April 16, 1937
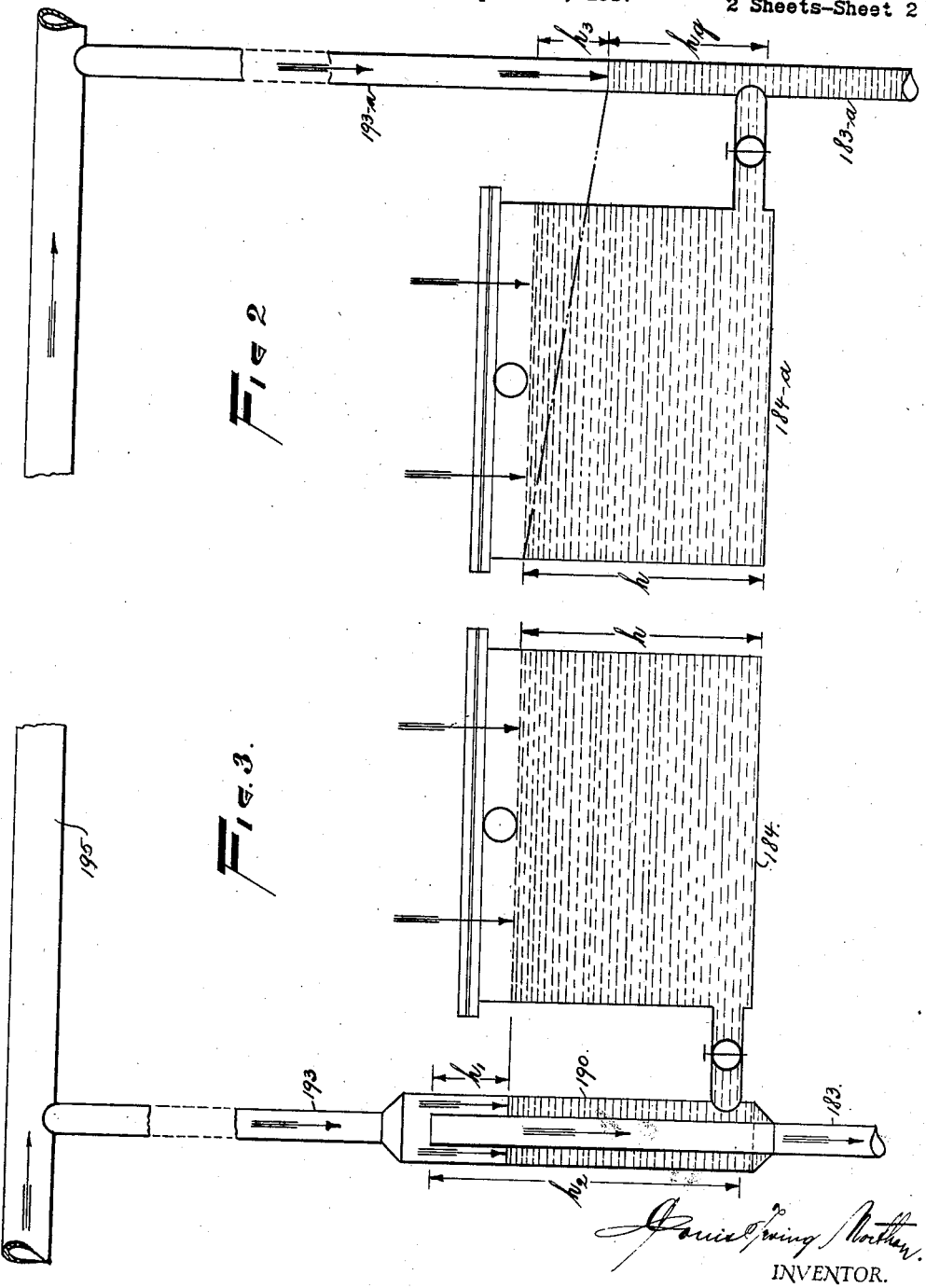
INVENTOR.

Patented June 18, 1940

2,205,305

UNITED STATES PATENT OFFICE 2,205,305

PREVENTION OF REVERSE FLOW IN WATER SUPPLY SYSTEMS

Louis Irving Northon, Washington, D. C.

Application April 16, 1937, Serial No. 137,232

2 Claims. (Cl. 137—79)

This invention relates to new and useful improvements in water-supply distributing systems and particularly to arrangements for preventing flow of liquid in other than the designed direction irrespective of pressure variations that may occur in the system, and to devices that may be employed in such systems.

An important, though not the only application of the invention will be in hot and cold water supply systems. When applied to such systems, according to the present invention reverse flow and, due to reverse flow, back-syphonage into water supply system is prevented. Owing to this, the infection and pollution of the water supply system is also prevented by eliminating all danger of back-syphonage that is usually caused from cross connected plumbing fixtures and other receptacles, etc., by pressure drop in the system.

According to the invention, means are provided to prevent the slightest occurrence of sub-atmospheric pressure in the water-supply system. This arrangement must be distinguished from arrangements in which atmospheric air is introduced only after the occurrence of a partial vacuum or, of a vacuum at its critical pressure and, therefore, after back-syphonage has or could have occurred.

This and other features will more clearly appear from the following detailed description of several embodiments thereof and the appended claims.

In the drawings Fig. 1 is a schematic representation of a hot and cold water supply system embodying the invention;

Fig. 2 is a side elevation of a receptacle with which a pipe is connected in accordance with the usual practice; and Figure 3 is a side elevation of a receptacle with which a pipe is connected in accordance with an important feature of the present invention.

In buildings more than eight stores high, it is usual to arrange the water supply system of the first seven floors in the manner of the well known direct feed system, i. e., when the first seven floors are supplied direct from the city supply main, and the floors from the eighth floor in the manner of the well known down-feed system. Fig. 1 illustrates the application of some of the features of the present invention which according to the indicated details is a combination of an up-feed and down-feed water supply system.

Water is pumped by means (not shown) into a tank 176 located on the roof of the building, and provided with an overflow 196. Automatic means (not shown) are provided to maintain the water at a certain level in said tank. The mean water-level being indicated by the horizontal dotted line marked CT (center line of the tank 176). Water flows from tank 176 by gravity into supply headers 177 and 178. The former may lead, e. g., to a supply stand pipe on the street (depending on local ordinances pertaining to this matter) and the latter (178) is connected through a hydraulic-seal 179 with down-feed riser 180. The lower end of riser 180 divides and opens into horizontal distributing pipes 181 and 182. 181 opens into hot water storage tank 175 near the bottom thereof, and 182 is connected with up-feed risers like 183 through which cold water is supplied to fixtures 184, 185 and 186 on the various floors. Hot water generated by suitable means in the hot water storage tank 175 is supplied to fixtures 184, 185, etc., on the various floors. Hot water generated in tank 175 is supplied to fixtures 184, etc., through a horizontal distributing main 186a and through the vertical up-feed riser 187. 188 is a hot-water return circulating pipe which is connected to the bottom of tank 175 through pipeline 189. The top of the cold water up-feed riser 183 is provided with a hydraulic-seal 190 and the top of the hot-water up-feed riser 187 is also provided with the hydraulic-seal 191.

This arrangement may be used to supply with water the top floors (above the eighth) of a tall building, or it may be used to supply the entire building. In the former case hot-water tank 175 is located just below the eighth floor and in the latter case, in the basement of the building.

From the arrangement shown in Fig. 1 it may be seen, therefore, that hot and cold water is supplied to the various plumbing fixtures, or, any other receptacles at various floor heights through a combination of the gravity down-feed riser 180 and creating thereby through the distributing-mains 181, 182 and 186a the 183 and 187, etc., up-feed risers. In the present design or arrangement the hot-water tank 175 and the entire water supply system is fed by gravity and the system is not connected directly to the city supply main. Since the water supply system is not connected to the city supply-main therefore irrespective of any pressure drop which may occur either in the house water supply-system or, in the city supply main reverse flow or, back syphonage physically never can occur whereby infection and pollution of the said system is entirely prevented. However, in order to prevent back-syphonage, the supply-branches to the fixtures 185 and 186 must be taken off at points substantially higher than the highest possible waterline of any plumbing fixture or any other receptacle which has a submerged inlet or, in which a rubber hose or the like may be submerged. Fig. 1 shows at fixtures 184, 185 and 186 the installation method of the supply branches taken off from risers 183 and 187, which method will prevent flow from 184, 185 and 186 into risers 183, 187 and 188 when the water column in said risers drops below the water line in the fixtures 184, 185 and 186.

As shown in Fig. 1 each up-feed riser is equipped with a hydraulic-seal as 190 and 191. The indicated hydraulic-seals are not equipped with automatic or manual air supply devices at all, but these hydraulic-seals permanently communicate with the atmosphere through vertical air discharge and air-supply risers 192, 193 and 194. These risers are branched off from a horizontal air-discharge and air-supply header 195 located higher than the top of the overflow 196, and always at a point above the highest waterline of the tank 176. If the tank is within a heated housing, the pipe-lines 192, 193 and 194 should be connected to an air-supply and air-discharge header such as 195 within such housing.

It will be obvious from the foregoing that although no automatic air-supply and air discharge valves are provided in the water supply system shown in Fig. 1, back-syphonage will be prevented irrespective of any pressure variations that may occur in the system.

The hydraulic-seals 190 and 191 located on top of risers 183 and 187 separates the combined air-discharge and air-supply outlet and inlet from risers 183 and 187 and from the discharge outlets leading to fixture 184. This permits the placing of the independent combined air-discharge and air supply inlet connection, connected to pipelines 193 and 194 higher than the highest water-line in any plumbing fixture or, in any receptacle located on top floor. Where the plumbing fixtures, receptacles, etc., are equipped with bottom supplies, or where a rubber hose extension of an elevated outlet hangs in the receptacle, there is always danger that the polluted and infected contents of such receptacle, washing machine, hospital sterilizer bidet, reservoirs used in chemical industry, laundry equipments, etc., will be syphoned back into the water supply system.

For the sake of clarity the enlarged details of a hydraulic-seal and its operation principles are indicated on drawings Fig. 3 which shows the fixture 184 is connected on the left hand side to the outer (larger) shell of a hydraulic-seal in the same manner as 190 is connected to 183 and 184. The arrows indicate atmospheric air at 14.70 lbs. absolute pressure per square inch flowing into riser 183 which is connected to 193 and to header 195. If the height of the water in receptacle 184 is $h$ then the water-line in the outer shell of the hydraulic-seal will also be $h$ no matter how deep the water column may drop in riser 183. The water in the outer shell of the hydraulic-seal and in the receptacle 184 under no circumstances can obstruct the passage of the atmospheric air-flow through riser 183 to points which lie below 184, i. e., at lower floors.

In Figure 2, there is illustrated the present conventional supply inlet connection with a riser 183$a$. As the column liquid level falls in such riser 183$a$, it will relatively fall in receptacle 184$a$. However, the drop in riser 183$a$, will fall as indicated by $h_3$ to the height $h_g$ due to reverse flow which reverse flow is the consequence of a pressure drop in riser 183$a$ and water column $h$. By reason of this variation, the atmospheric pressure exerted on the surface of the liquid in receptacle 184$a$, will cause a reverse flow of liquid back into the riser.

It is obvious that it will be impossible to supply air into riser 183 to any point below outlet 184 while water stands in the riser above such point as the indicated $h_g$.

The water from the hydraulic seal 190 namely from its outer shell will always flow toward the receptacle 184. The flow will be caused by that constant pressure which is indicated on Fig. 3. This constant pressure is: $h_2 - h$ equals $h_1$.

The indicated $h_3$ is that pressure drop which is caused by the reverse flow in the extended part of the riser 183. Connecting the lower point of $h_3$ with the surface of the water in the receptacle 184 by a line indicates the referred hydraulic gradient. (Dotted line cross receptacle 184.)

As shown in Fig. 1 only one hydraulic-seal such as 190 is necessary at the top of each up-feed riser whether the riser supplies hot or cold water and irrespective of the number of branches or plumbing fixtures or any other receptacles connected to riser 183. The provision and installation of so-called "vacuum-breakers" for each individual plumbing fixture is wholly unnecessary in my system.

The riser 183 and so the other risers are open constantly to the prevailing atmospheric air, i. e., to the absolute pressure of the atmospheric air, therefore, the critical sub-atmospheric pressure, i. e., negative pressure, can never occur in said risers, and in the connected supply-branches at the lower floors. If the prevailing atmospheric pressure exceeds the negative pressure created by the water column dropping in an up-feed riser, reverse flow and back-syphonage cannot be prevented. If a partial vacuum were created in riser 183 water would be sucked out from 184, 185 and 186 through their supply branches. In order to prevent this, the air-discharge and air-supply risers 192, 193, 194 and the air-discharge and air-supply header 195 are constantly open to the prevailing pressure of the atmosphere thereby the atmospheric air must follow in said pipe-lines the constantly fluctuating water-levels in risers 183, 187 and 188. The velocity of the air-flow in said pipe-lines is always the same as the velocity of the downfalling water column in said risers in a case of a pressure drop. The difference in pressure drop due to frictional losses in said pipe lines due to flow of air, and due to flow of water is considerably large. This considerable difference due to frictional losses is well explained by considering the extremely large difference of density between the two elements, i. e., 1 cubic foot of water at a temperature of 65 degrees Fahr. has a density of 62.34 lbs. per cubic foot, and the density of the air at the same temperature is: 0.074 lb. per cubic foot.

Ratio of densities:

$$\frac{62.34}{0.074} = 842$$

The indicated ratio of densities of the two elements assures that the flow of the atmospheric air into the risers will not cause even such pressure drop which is sufficient to create the critical pressure of sub-atmospheric conditions which is:

Critical pressure of vacuum:

$$\frac{1}{29.92} = 0.033 \text{ inch}$$

mercury column equivalent of 0.016 lb. per square inch of sub-atmospheric pressure.

From the foregoing is clearly seen that the atmospheric air is permanently present in said risers. Furthermore, that the atmospheric air is constantly exerting its pressure on the surface of the water in said risers where the pressure of the water is at atmospheric pressure and so is the pressure of the air. Since the pressure of the two elements being the same it is obvious that the pressure of the two elements are constantly in equilibrium and due to this there cannot be any appreciable pressure loss caused by air-flow not even such pressure loss which would be 0.016 lb., i. e., the lower limit of critical sub-atmospheric pressure. The proper size of 192, 193, 194 and 195 is a matter of adapted hydraulical and pneumatical computations since the pipe-sizes must be always in strict accordance with the diameters of the risers 183, 187, etc., and in strict accordance with the largest expectable pressure drop in said risers when the downfalling water column will create the largest velocity of flow.

Various other modifications and combinations of the features of my invention may be effected without departing from its spirit.

Having now described my invention what I claim as new and desire to secure by Letters Patent, is:

1. A receptacle, a conduit for supplying liquid to said receptacle and having an open end extending above said receptacle, a shell surrounding and spaced from said open end, means for venting said shell to the atmosphere, and means for connecting said receptacle to said shell with said open end above the normal liquid line in said receptacle.

2. A receptacle, a conduit for supplying liquid to said receptacle and having its upper end open and arranged above the normal liquid level line of the receptacle, a shell surrounding and spaced from said open end, means for connecting said receptacle to said shell below said open end, and means for venting said shell to the atmosphere.

LOUIS I. NORTHON.